United States Patent
Maida et al.

(10) Patent No.: US 10,765,958 B2
(45) Date of Patent: Sep. 8, 2020

(54) SYSTEM, METHOD, AND APPARATUS FOR POWER LIMITED SKY DIVING WIND TUNNEL DRIVE TRAIN/FAN

(71) Applicant: Maida Engineering, Inc., Philadelphia, PA (US)

(72) Inventors: Joseph F. Maida, Fort Washington, PA (US); Arthur Armellini, Huntingdon Valley, PA (US)

(73) Assignee: Maida Engineering, Inc., Philadelphia, PA (US)

( * ) Notice: Subject to any disclaimer, the term of this patent is extended or adjusted under 35 U.S.C. 154(b) by 0 days.

(21) Appl. No.: 16/373,608

(22) Filed: Apr. 2, 2019

(65) Prior Publication Data

US 2019/0329142 A1    Oct. 31, 2019

Related U.S. Application Data

(60) Provisional application No. 62/651,697, filed on Apr. 2, 2018.

(51) Int. Cl.

| | |
|---|---|
| A63G 31/00 | (2006.01) |
| F04D 27/00 | (2006.01) |
| G09B 9/00 | (2006.01) |
| F04D 29/063 | (2006.01) |
| F16H 57/04 | (2010.01) |
| F04D 19/00 | (2006.01) |

(52) U.S. Cl.
CPC ........... *A63G 31/00* (2013.01); *F04D 19/002* (2013.01); *F04D 27/004* (2013.01); *F04D 29/063* (2013.01); *F16H 57/04* (2013.01); *G09B 9/00* (2013.01)

(58) Field of Classification Search
CPC .......... A63G 31/00; A63G 2031/005; F04D 19/002; F04D 27/004; F04D 29/063; F16H 57/04; G09B 9/00; B64D 23/00; G01M 9/02
USPC ......................................................... 472/137
See application file for complete search history.

(56) References Cited

U.S. PATENT DOCUMENTS

| | | | | |
|---|---|---|---|---|
| 5,753,811 | A * | 5/1998 | Consolini | A63G 31/00 472/50 |
| 8,344,673 | B2 * | 1/2013 | Rotondo | F01D 15/08 318/432 |
| 2007/0078614 | A1 * | 4/2007 | Discenzo | G05B 19/4062 702/60 |
| 2009/0184575 | A1 * | 7/2009 | Armstrong | B60L 50/13 307/9.1 |
| 2009/0312111 | A1 * | 12/2009 | Gil | A63G 31/00 472/137 |
| 2010/0307270 | A1 * | 12/2010 | Brick | F16H 1/145 74/423 |
| 2014/0244051 | A1 * | 8/2014 | Rollins | F04D 25/0606 700/282 |

(Continued)

*Primary Examiner* — Michael D Dennis
(74) *Attorney, Agent, or Firm* — Howard IP Law Group, PC

(57) ABSTRACT

A drive train for a wind tunnel having a nacelle housing with a fan and a fan hub assembly. The drive train comprises: a ratio gear box directly connected to the fan; and a motor disposed remote from the nacelle for powering the fan via a jackshaft and the ratio gearbox. In an embodiment, the wind tunnel has a single fan and single hub assembly. The jackshaft operatively connects the motor and gearbox.

21 Claims, 10 Drawing Sheets

(56) References Cited

U.S. PATENT DOCUMENTS

2015/0375125 A1* 12/2015 Lurie .................... A63G 31/00
                                                      472/49
2019/0101436 A1* 4/2019 Li ......................... H02K 11/21

* cited by examiner

SYSTEM, METHOD, AND APPARATUS FOR POWER LIMITED SKY DIVING WIND TUNNEL DRIVE TRAIN/FAN

CROSS-REFERENCE TO RELATED APPLICATIONS

This application claims priority under 35 USC 119 to provisional patent application Ser. No. 62/651,697 filed Apr. 2, 2018, the entire disclosure of which is hereby incorporated by reference for all purposes as if being set forth in its entirety herein.

FIELD OF THE INVENTION

The application relates to the field of wind tunnels. More particularly, the application relates to systems, methods, and apparatus for sky diving wind tunnels having improved performance, reliability, safety, energy efficiency, reduced nacelle footprint and/or reduced fan requirements.

BACKGROUND

Wind tunnels are used in testing of aircraft, surface, ground, and subsurface vehicles, launch vehicles, buildings and other fixed structures, training systems, as well as for recreational use and amusement.

Significant power resource requirements, inadequate safety mechanisms, and large component structural size as well as increased component number requirements, have led to wind tunnel systems having a large footprint and that are extremely costly to operate and maintain. Further, existing systems are energy inefficient, potentially hazardous, difficult to commission, and lacking in performance. Alternative systems, methods, and apparatus for alleviating one or more of the above problems are desired.

SUMMARY

In an embodiment of the present disclosure, there is provided a more reliable and safer drive train and fan for vertical sky diving wind tunnels. To reduce the power and enhance reliability, a ratio gearbox which directly connects to a single fan, is provided within the nacelle and replaces the motor within the nacelle. Locating the motor in a location outside of the wind tunnel not only reduces the size of the nacelle, but also provides for greater accessibility. Configuration of a ratio gearbox within the nacelle also reduces the horsepower requirements for both the motor and the variable frequency drive. Controls are provided that run the motor within a defined speed range and further eliminates the need for supplemental motor cooling.

The system is further configured with a single fan, nacelle and motor such that if electrical power to the system is lost, the single fan has sufficient mass and inertia in relation to the wind tunnel such that the rotation rate is reduced at a sufficiently slow level to enable a flyer (person or user) to be lowered so as to avoid an abrupt drop and thereby reduce the likelihood of injury. Multiple nacelles, motors and fans within a sky wind tunnel require more power, are more difficult to maintain, and do not have the fan mass and inertia to maintain air speed to slowly lower a flyer upon the loss of electric power. Embodiments of the present disclosure eliminate one or more of the above-identified problems while providing enhanced system operation and control and with reduced power requirements.

In an embodiment there is disclosed a drive train for a wind tunnel having a nacelle housing with a fan and a fan hub assembly. The drive train comprises: a ratio gear box directly connected to the fan; and a motor disposed remote from the nacelle for powering the fan via a jackshaft and the ratio gearbox. In an embodiment, the wind tunnel has a single fan and single hub assembly. The jackshaft operatively connects the motor and gearbox.

In an embodiment, a system for controlling a wind tunnel having a fan and nacelle comprises a ratio gearbox housed within the nacelle of the wind tunnel and directly connected to the fan; a motor disposed remote from the nacelle for powering the fan via a jackshaft and the ratio gearbox; and a variable frequency drive positioned remote from the wind tunnel and configured to regulate the speed of the motor within a range sufficient to negate supplemental external cooling of the motor.

The system further includes a lubrication system disposed remote from the nacelle and coupled to the ratio gearbox for controllably dispensing lubricant thereto.

In an embodiment the variable frequency drive may include an electronically controllable switch for selectively disconnecting power to the motor in response to a user operation. The switch is configured as a small disconnect switch of reduced size and operates to advantageously replace large high power disconnect switches typically required of conventional systems.

In an embodiment, the variable frequency drive includes an electronic circuit with inherent redundancy that is connected to a switch for virtually disconnecting power to the motor in response to user operation of the switch. In an embodiment, the switch is configured as a small two pole toggle switch of reduced size and operates to advantageously replace large high power disconnect switches typically required of conventional systems having a relatively large motor.

In an embodiment, a simulator comprises: a wind tunnel chamber; a nacelle disposed within the wind tunnel chamber and including a ratio gearbox directly connected to a fan; a motor disposed remote from the nacelle for powering the fan via a jackshaft and the ratio gearbox; and a variable frequency drive positioned remote from the wind tunnel chamber and configured to regulate the speed of the motor to thereby maintain a temperate of the motor within predetermined range that is sufficiently low to obviate the need for supplemental external cooling.

In an embodiment, a simulator comprises: a wind tunnel chamber comprising a first vertical flight chamber and a second vertical chamber remote from the first vertical flight chamber and communicatively coupled thereto via air flow conduits; a nacelle disposed within the second vertical chamber of the wind tunnel chamber and including a ratio gearbox directly connected to a fan; a motor positioned remote from the nacelle and wind tunnel chamber for powering the fan via a jackshaft and the ratio gearbox; and a variable frequency drive positioned remote from the wind tunnel chamber and configured to regulate the speed of the motor to thereby maintain a temperate of the motor within a predetermined range. In an embodiment, a programmable logic controller is responsive to one or more environmental parameters for generating a control signal to the variable frequency device to controllably adjust motor speed.

In an embodiment, a lubrication system is located remote from the wind tunnel chamber and coupled to the ratio gearbox for controllably dispensing lubricant thereto.

In one aspect, the programmable logic controller is responsive to one or more of temperature, pressure, leakage, and flow parameters output from the lubrication system for generating a control signal to the variable frequency device to controllably adjust motor speed.

In an embodiment, the variable frequency drive is an IEEE 519 compliant VFD which controllably adjusts at least one of frequency and voltage applied to said motor to operate said motor at one of two predetermined RPM rates.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts and in which.

DETAILED DESCRIPTION

It is to be understood that the figures and descriptions of the present disclosure show, by way of illustration, specific embodiments in which aspects of the invention may be practiced. It is to be understood that the various embodiments illustrate particular features, structures, or characteristics described herein in connection implementation of a drive train, system, and method for making such drive train and system, without departing from the scope of the invention.

Reference will now be made in detail to the present exemplary embodiments of the disclosure, examples of which are illustrated in the accompanying drawings. Wherever possible, like reference numbers will be used throughout the drawings to refer to like parts.

According to an aspect of the present disclosure, a sky diving tunnel drive train/fan system is implemented with only a single fan (vis-a-vis multiple fans) that provides increased wind tunnel performance, and decreased horsepower, which reduces utility costs. The system according to the present disclosure, by implementing a lower horsepower, also eliminates the need for ground fault protection and concomitant potential nuisance loss of utility power. The system of the present disclosure possesses a rated horsepower to produce sufficient torque when the motor runs above a given rated frequency (e.g. 60 hertz), thereby producing an optimized (highest) wind speed under the specified load.

Figure 1:
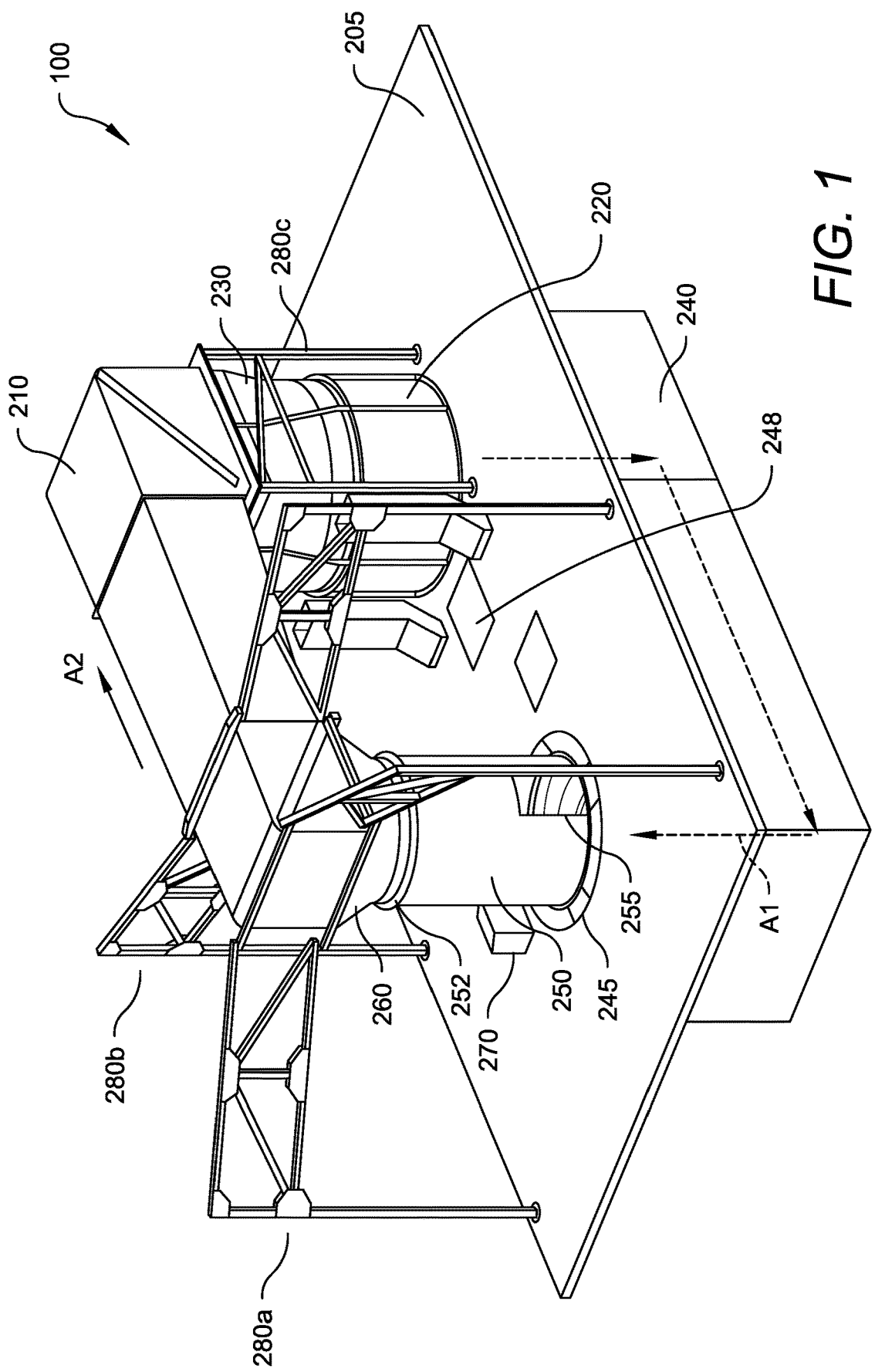
FIG. 1 is an exemplary diagram illustrating components of a closed architecture implementation according to an embodiment of the disclosure.
Figure 2:
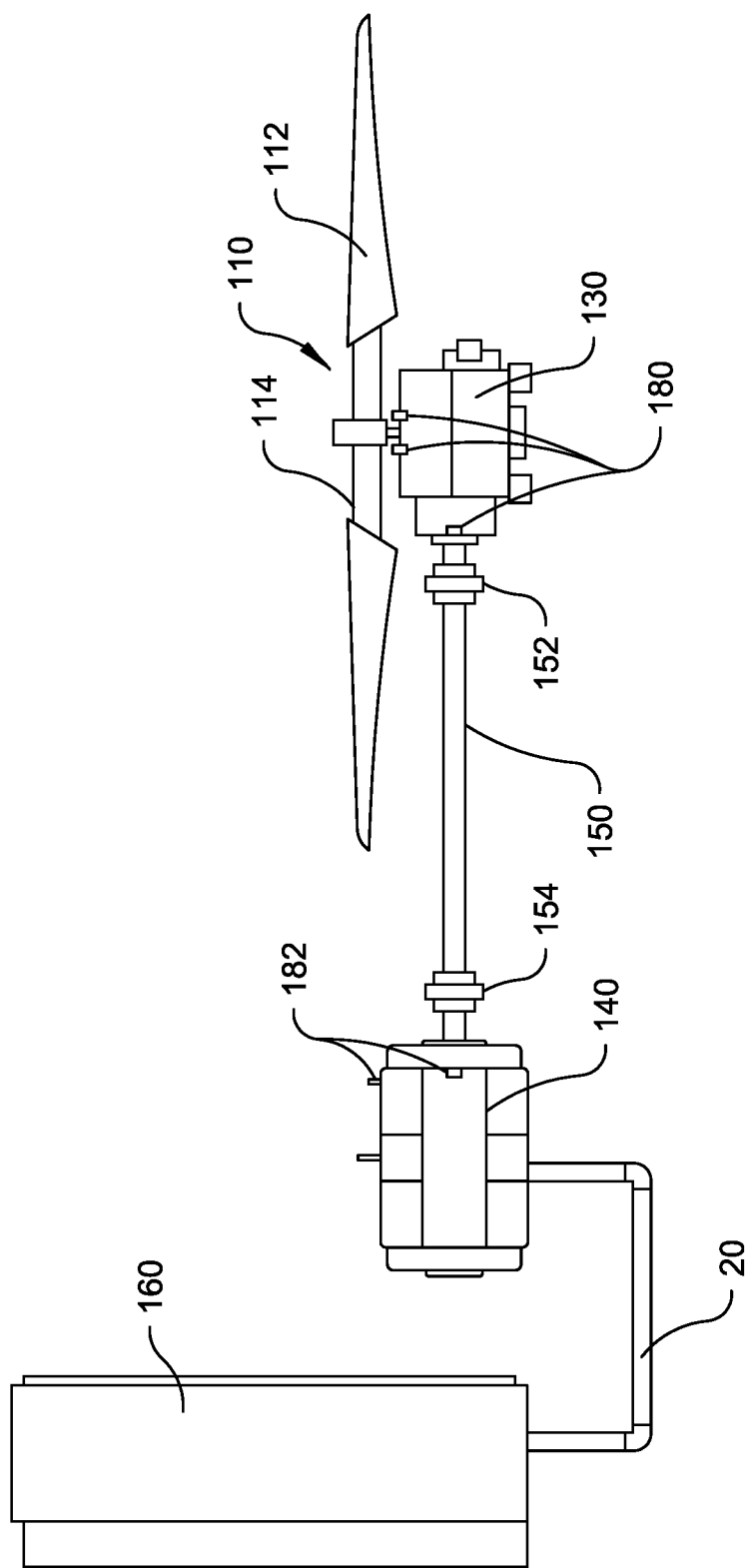
FIG. 2 is an exemplary schematic diagram illustrating components of the system including the gearbox, jack shaft, motor, fan, and variable frequency drive (VFD) according to an embodiment of the disclosure.
Figure 3:
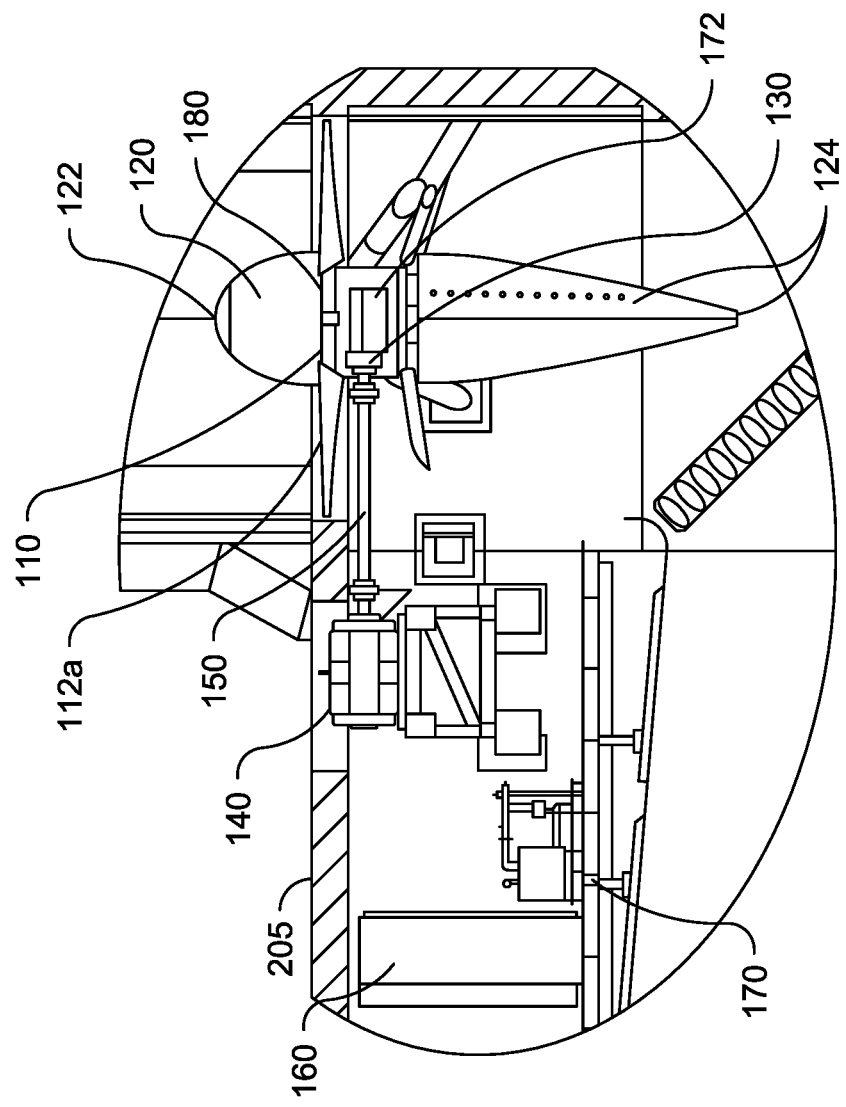
FIG. 3 is an exemplary partial cross-section view illustrating components according to an embodiment of the disclosure.

Referring now to FIG. 1, in conjunction with FIGS. 2 and 3, there is shown a system 100 for directing air flow within a vertical sky diving wind tunnel, according to an embodiment of the present disclosure. FIG. 1 illustrates an exemplary closed loop configuration 100 comprising a single fan and hub assembly 110 (FIG. 2) housed within a cylindrical fan section 220 and connected via air flow duct 240 to wind tunnel flight chamber 250. Flight chamber 250 is configured to accommodate one or more skydivers or players within the chamber. Fly door 255 provides ingress/egress to flight chamber 250. Grid floor 245 is configured to support the weight of the player(s) entering the chamber while allowing air flow through the floor in the direction of arrow $A_1$ with force sufficient to controllably elevate the one or more players from floor 245 via control system 270 which is operatively connected to the motor and single fan and hub assembly. Flight chamber 250 terminates at ceiling grid 252 connected to diffuser section 260. Floor grid 245 and ceiling grid 252 provide vertical boundaries for each of the players within chamber 250. Air flow duct 210 coupled to diffuser section 260 conveys via fan diffuser 230 air flow in the direction of arrow $A_2$ through to fan section 220 for circulation/re-circulation through the closed loop system. Supports 280*a* and 280*b* provide structural support for the wind tunnel flight chamber portion while support 280*c* provides structural support for the fan diffuser and fan section. A motor pit hatch 248 located on platform 205 provides access to the motor and associated equipment.

To reduce power and enhance reliability, a ratio gearbox 130 (FIG. 2) which directly connects to single fan and hub assembly 110, is provided within nacelle or housing 120 (FIG. 3) and replaces the motor that would otherwise be located in the nacelle. FIG. 2 illustrates the configuration of key components of the drive train and fan and hub assembly according to an embodiment of the disclosure. As shown, a jackshaft 150 connects external motor 140 to the ratio gearbox 130. This design enhances the efficiency of the wind tunnel as it reduces the size of the nacelle and eliminates the need for large electrical conductor circuitry connecting the motor to be housed within the nacelle. Jackshaft 150 is smaller in diameter than the overall diameter of the electrical circuit conductors. The electric circuit conductors consist of parallel conductors within multiple conduits 20 that connect to the motor. Reducing the size of the nacelle and the obstruction between the nacelle and the wall of the wind tunnel lowers the drag on the air and increases the overall system efficiency.

In an embodiment there is disclosed a drive train for a wind tunnel having a nacelle housing with a fan and a fan hub assembly. The drive train comprises the ratio gear box 130 directly connected to the fan 112 and jack-shaft 150 that connects the gearbox to the motor 140. The design uses a standard horizontal motor located outside of the wind tunnel. The horizontal motor provides power to the fan via the jackshaft and the ratio gearbox. Larger diameter wind tunnels requiring more horsepower, could have additional fans, each with a dedicated blade hub assembly, jack shaft and motor as shown in FIG. 2. According to an embodiment of the present disclosure, there may be one VFD per motor as shown in FIG. 2, or one VFD for multiple motors.

According to an embodiment of the disclosure, locating the motor 140 remote from (outside of) the wind tunnel provides greater access to the motor and enables use of a standard horizontal motor (e.g. 450 HP motor), rather than a customized, more expensive, non-standard inverted vertical motor, which may also require a drive end thrust bearing. The use of standardized units for the ratio gearbox with a drive end thrust bearing and a standard horizontal motor increases the system reliability while reducing the overall required horsepower to produce the same wind speed by about 25 percent (e.g. from 600 HP to 450 HP), thereby reducing both the initial cost as well as the operating costs Still referring to FIGS. 2 and 3, use of a ratio gearbox 130 mechanically multiplies the motor 140 output torque, which is the force of rotation, at any given horsepower as can be determined by the following equation. In a preferred embodiment, ratio gearbox 130 is implemented as a 2.5:1 ratio gearbox, with an 1,800 revolutions per minute (RPM) motor 140 to run the fan 112 at 720 RPM provides a torque determined as:

$$TORQUE=(5252\times HP)/RPM$$

In an advantageous embodiment, use of the 2.5:1 ratio gearbox in combination with programming of the system to always operate at above a select RPM value, eliminates the need for a costly supplemental external cooling system for the motor.

According to an advantageous embodiment, a variable frequency drive (VFD) 160 is electrically coupled to motor 140 via motor branch circuit cables 20 (FIG. 2) which vary the frequency and/or voltage of the motor to turn the device at different speeds. The system is configured to operate at either 0 RPM or above 500 RPM, but never in between these conditional values. A VFD, when powering variable torque loads, which includes fans, enables the system's horsepower to be reduced by the cube of the RPM while the torque is reduced by the square of the RPM. When the motor torque is reduced by 20%, in response to reduced torque needed at the higher speeds, the horsepower will be reduced by 51%.

Figure 4:
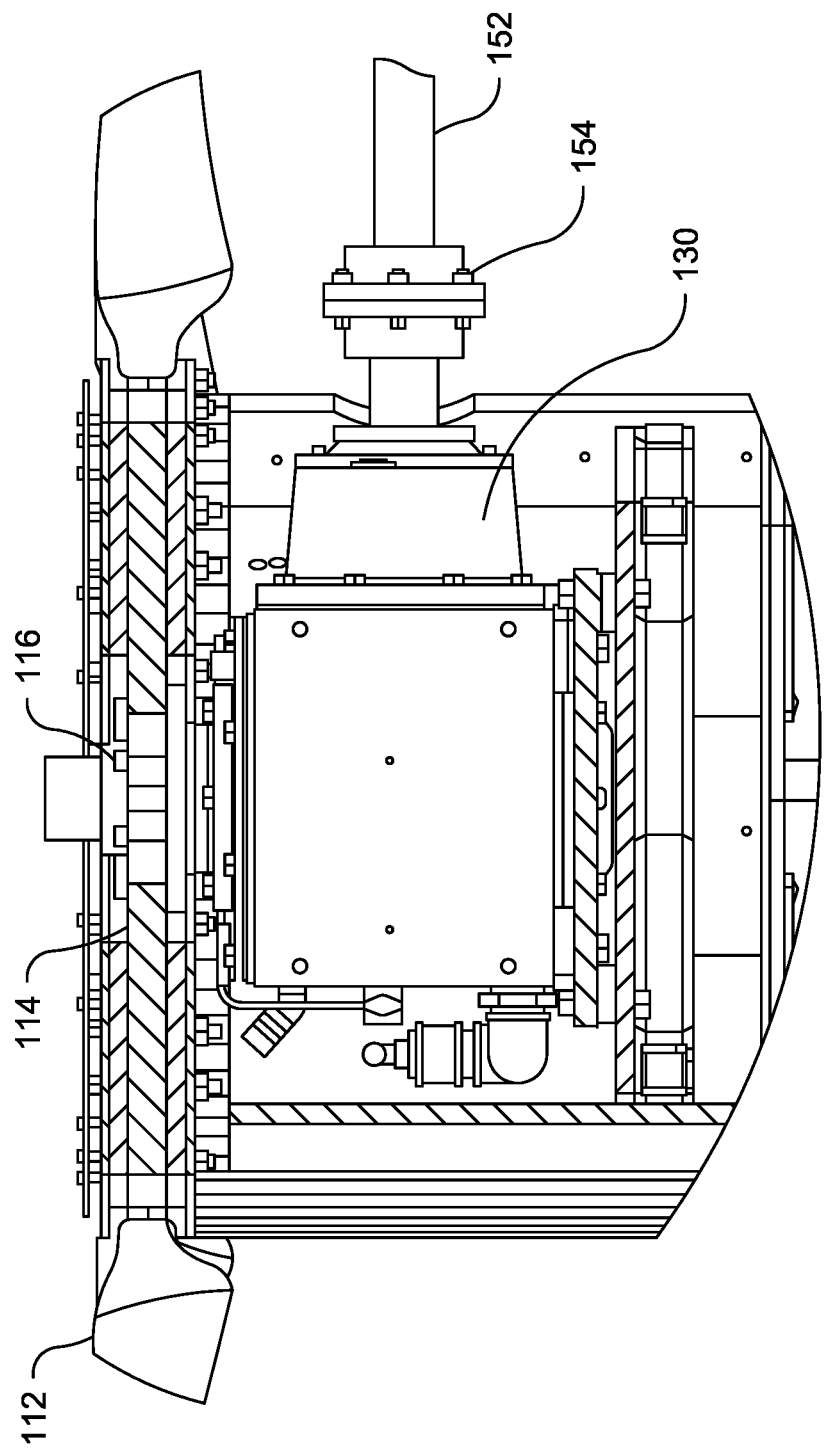
FIG. 4 is a more detailed exemplary partial cross-section view of the ratio gearbox, fan, and jack shaft components according to an embodiment of the disclosure.

According to an embodiment of the disclosure, each of the mechanical system components, including the fan hub 114, are designed with no single latent points of failure through use of redundant instruments and control devices or equivalent SIL rated relays. As shown in FIG. 4, the system of the present disclosure includes a plurality of fasteners such as bolts 116 connected through the fan hub 114 to the gearbox shaft, in contrast to commonly used press-fit connections between the fan hub and drive shaft. Jack shaft 150 is directly coupled to ratio gearbox 130 and motor 140 via respective couplers 152, 154 (FIG. 2, 4) fixedly connected (e.g. bolted) thereto.

Figure 8:
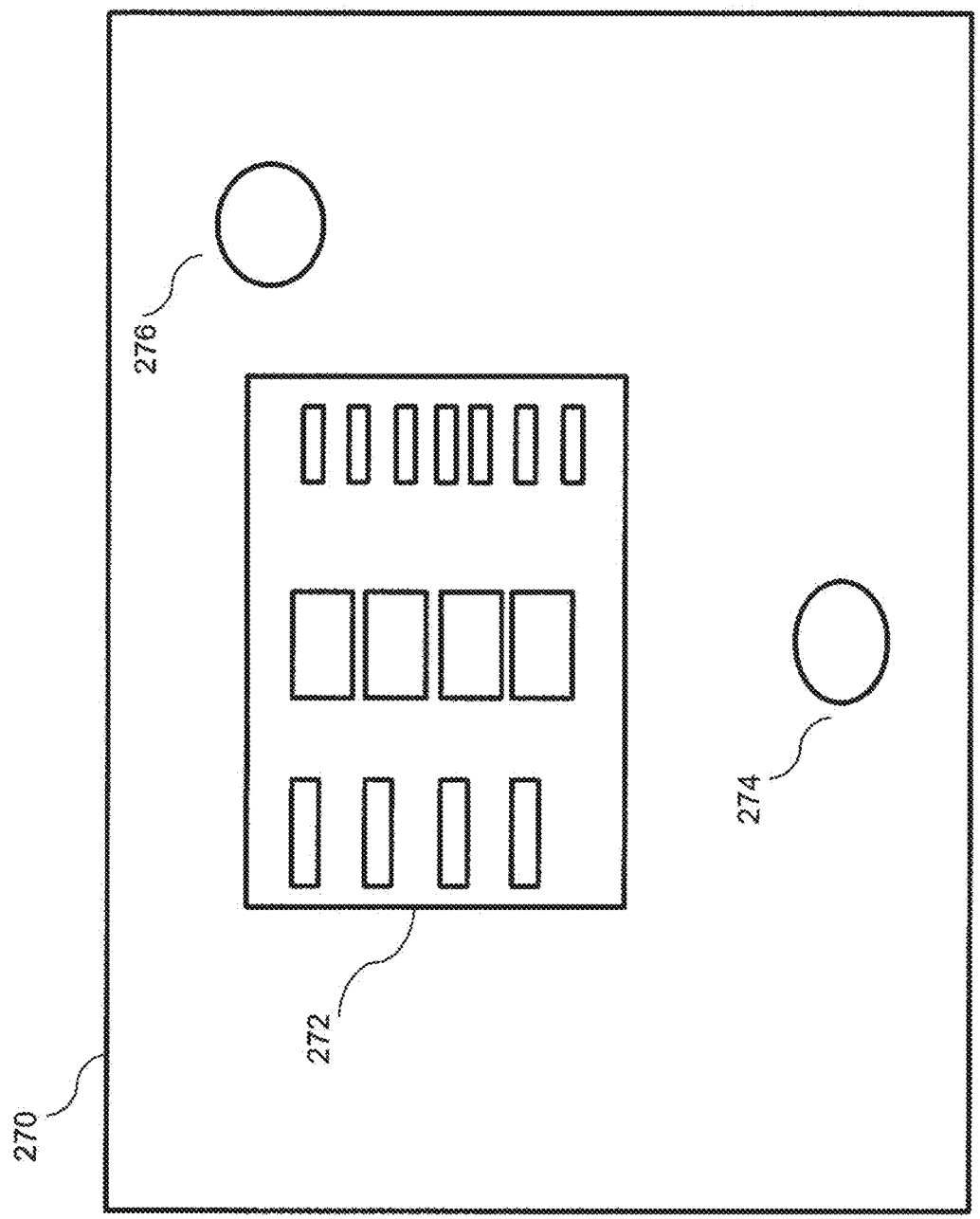
FIG. 8 is an exemplary diagram of a PLC control system and user interface according to an embodiment of the disclosure.

In an embodiment, a system for controlling a wind tunnel having a fan and nacelle comprises a ratio gearbox housed within the nacelle of the wind tunnel and directly connected to the fan. Motor 140 is disposed remote from the nacelle for powering the fan 112 via jackshaft 150 and the ratio gearbox 130. A variable frequency drive 160 located remote from the wind tunnel is configured to regulate the speed of the motor within a range sufficient to negate supplemental external cooling of the motor. A programmable logic control system 270 is programmed to only generate control signal to VFD 160 to run the motor within a defined speed range, thereby eliminating the need for supplemental motor cooling. FIG. 8 shows an exemplary illustration of the PLC control system and user interface (HMI) 270 showing the operator console and display 272 for displaying notifications, alerts, status, operator controls, and the like. A potentiometer control 274 is provided to enable user selection and control of the motor speed. E-stop selector 276 is also provided on the console display.

According to an embodiment of the disclosure, the system is further configured with nacelle that has a jackshaft for a single fan connected to a single motor via a jackshaft motor such that if electrical power to the system is lost, the single fan's hub has sufficient mass and inertia in relation to the wind tunnel such that the rotation rate is reduced at a sufficiently slow level to enable a flyer (person, player, or user) to be lowered so as to avoid an abrupt drop and thereby reduce the likelihood of injury.

In an embodiment, the system is implemented via a standard horizontal motor located outside of the wind tunnel. The horizontal motor provides power to the fan via the jackshaft and the ratio gearbox. The horizontal motor is controlled by the VFD 160, which is implemented as an ultra-low harmonic Variable Frequency Drive useful in buildings where the wind tunnel is the primary load on the utility service entrance in compliance with industry and utility recommended standards for harmonics, IEEE 519-2014 IEEE Recommended Practice and Requirements for Harmonic Control in Electric Power Systems.

In an embodiment, PLC 270 may be software enabled to communicate with the IEEE 519 compliant VFD for controlling motor speed via Ethernet or wires. In an embodiment, an ultra-low harmonic variable frequency drive (VFD) that uses front end rectifier with insulated gate bipolar transistors (IGBTs) may be used as an alternative to a diode based VFD. The IGBTs are controlled to minimize harmonics (electrical noise) on the supply power distribution system, enabling the use of the VFD in buildings where the wind tunnel is a large or majority portion of the total building load. Because of the size of the motor (e.g. 500 HP) the use of a standard 6 pulse diode front end VFD may create electrical problems within the venues where such a fixed system wind tunnel would be installed. Alternative 12 and 18 pulse VFDs that provide harmonic attenuation use phase shifting transformers and require more space may be used but are predicted to be less efficient. In an embodiment, an ACS-880-37 VFD may provide high efficiency and due to its reduced size can be installed in a relatively small equipment room or small electrical room.

In an embodiment a system for controlling a wind tunnel having a fan and nacelle comprises a ratio gearbox housed within the nacelle of the wind tunnel and directly connected to the fan. A motor is disposed remote from the nacelle for powering the fan via a jackshaft and the ratio gearbox; and a variable frequency drive that has a Select Torque Off. According to an embodiment, the system utilizes within a VFD a Safe Torque Off (STO) functionality that selectively prevents the VFD from generating torque in the motor. It ensures that no torque generating energy continues to act on the motor and that the motor cannot be re-started until the STO is removed. Hence once activated, the motor will not turn after it has come to a stop. Implementation of the STO feature enables the Safe Torque Off Control Station, which allows a technician to safely inspect the fan blades and other mechanical components, with the illumination of a lighted display (e.g. green light (safe), red light (not safe)). The STO feature may also be used after an emergency stop (E-STOP), thereby enhancing the overall safety of the system.

In an embodiment a system for controlling a wind tunnel having a fan and nacelle comprises a ratio gearbox housed within the nacelle of the wind tunnel and directly connected to the fan; a motor disposed remote from the nacelle for powering the fan via a jackshaft and the ratio gearbox; and a variable frequency drive that has redundant emergency stop pushbuttons. Hard wired, redundant emergency stop pushbuttons, one on the console and the other at the wind tunnel door, enables the operator at the console or flight instructor at the door to perform a controlled stop of the wind tunnel. The VFD will slowly lower the wind speed as the motor is stopped while the PLC illuminates a RED LED strip around the bottom of the wind tunnel flight chamber. After the time delay, set on a safety (SIL rated) relay, another safety relay will initialize the STO. An added benefit of this design is that if anyone removes the inspection hatch door for the blades, without switching the STO to the "ON" position, the PLC will initiate an equipment emergency stop which will activate the STO function after the time delay set in the safety relay. By way of example only, the emergency stop functionality may be implemented by an operator at the flight chamber door or at the control console.

Figure 5:
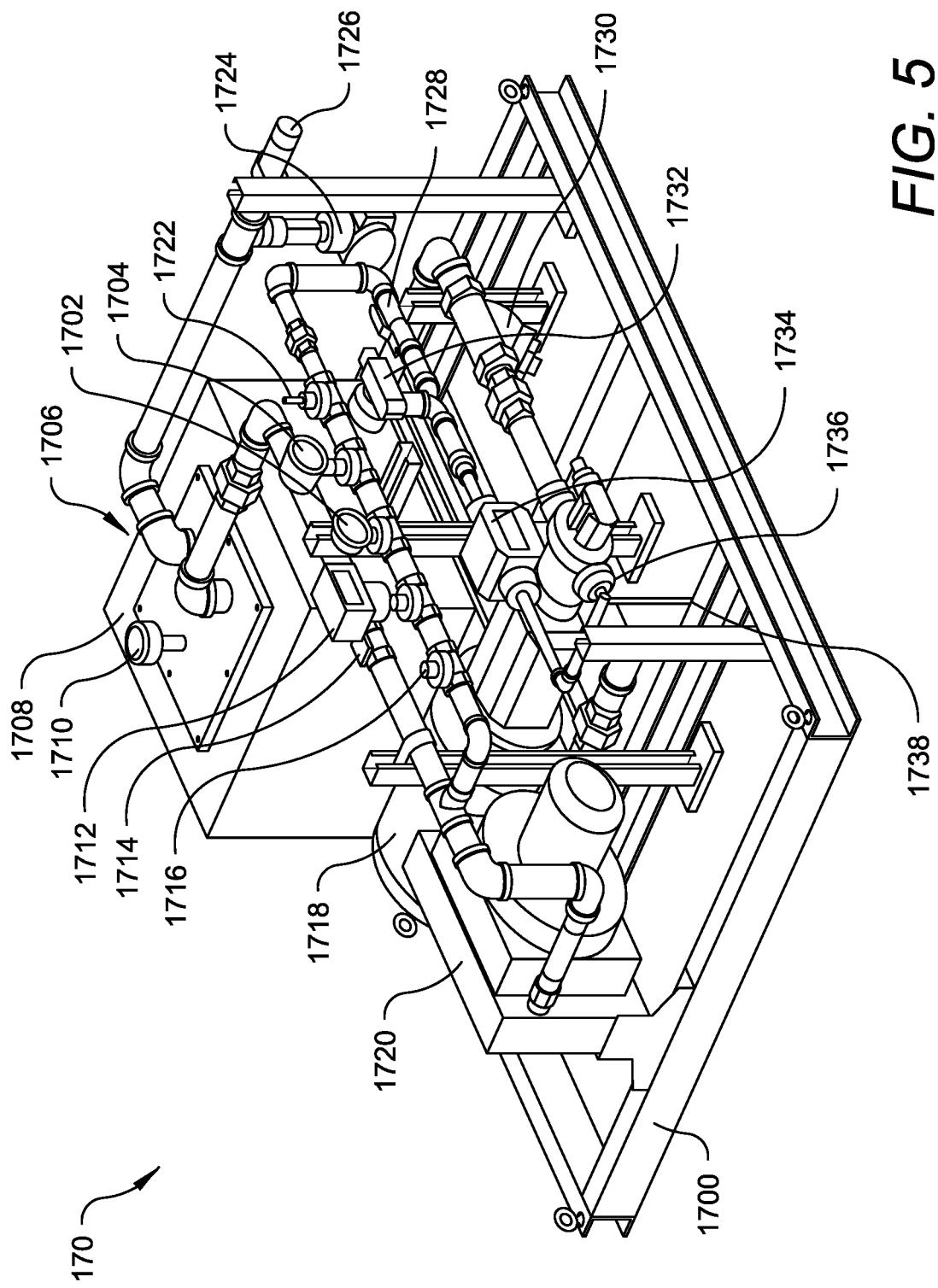
FIG. 5 is an exemplary diagram of a lubrication oil system according to an embodiment of the disclosure.

In another embodiment, responsive to a signal from the control panel, a lubrication oil system 170 maintains the flow and temperature of lubrication oil to and from the gearbox 130 using an oil pump 1718 (FIG. 5) and a lube oil fan and instruments controlled and monitored by PLC 270 via combination starters. FIG. 5 is a detailed illustration of the lubrication oil system 170. As shown in FIG. 5, a lube oil tank 1708 (e.g. 20 gal. capacity) provides a supply of lube oil via supply conduit 1736 to gearbox 130. Return conduit 1726 carries the oil returned from gearbox 130. Pump 1718 (e.g. 3 HP pump and motor at 15 GPM and 35 PSI) and cooling unit 1720 (e.g. 31,000 BTU/Hr lube oil cooling unit) provide circulation of the cooling lube oil. The lubrication system is housed on a skid and comprises a base 1700 containing the system components. The system includes pressure 1702 and temperature 1704 gauges, valves 1714 (bypass flow balancing valve), 1716 (check valve), and 1728 (gearbox flow balancing valve), and switching devices 1712 (low oil pressure switch), 1722 (cooler fan switch), 1724 (oil high temp switch), 1732 (low flow switch), 1734 (flow meter and high flow switch), and 1738 (oil leak switch) to regulate oil flow according to one or more operating conditions associated with the lube oil system. Tank 1708 includes oil level gauge, drain plug and magnetic chip detector 1706 and air vent/filter 1710. Oil strainer 1730 operates to remove system debris and contaminants from the circulating fluid.

In an embodiment there is disclosed a system for controlling a wind tunnel having one or more nacelles for each fan and nacelles comprising a ratio gearbox housed within the nacelle of the wind tunnel and directly connected to the fan; a motor located remote from the nacelle for powering the fan via a jackshaft and the ratio gearbox; and a variable frequency drive (VFD) or variable frequency drives positioned remote from the wind tunnel and a control console consisting of a programmable logic controller (PLC), a Human Machine Interface (HMI) and a potentiometer that enables the wind tunnel operator to run the fan at RPMs above the RPM for which the motor does not require external supplemental cooling. In an embodiment, for implementation of a 2.5:1 ratio gearbox, when the fan runs at 200 RPM the motor runs at 500 RPM. This motor rotation eliminates the need for external supplemental cooling of the motor, which is an added benefit of using an 1,800 RPM motor, but does not constitute sufficient wind speed to enable flight in the tunnel. The PLC is configured to operate to only send RPM values to the VFD that are at or above 500 RPM. The VFD is configured to only run between 500 RPM and 1915 RPM and will require the operator to bring the air speed in the tunnel to 40 miles per hour (MPH) when an operator turns the tunnel off and on from the HMI. Afterwards, the operator can increase the air speed using the potentiometer in a range between 40 MPH and 157 MPH.

The drive train and single fan implementation of the present disclosure provides a design applicable for multiple utility and motor voltages and is not limited to small sky diving wind tunnels. For small sky diving wind tunnels, the reduced horsepower enables use of a 480 volt electrical service which provides the following benefits:
  a. Eliminates the NEC requirement for ground fault protection and the potential for nuisance tripping associated with ground fault protection;
  b. Enables selection of overcurrent protective devices which reduces the incident energy level at the electrical equipment caused by arc flashes, thus reducing the electrical hazard;
  c. Using an active front end variable frequency drive that complies with IEEE 519-2015 versus a standard 6 pole diode passive find end VFD eliminates harmonic problems within building where the wind tunnel is the major load.

With a variable frequency drive for a variable torque load such as the wind tunnel fan, the torque is proportional to the square of the speed while horsepower is proportional to the cube of the speed. The system employs an easily maintainable and replaceable horizontal motor located outside of the wind tunnel. The motor connects to a right angle gearbox using a jackshaft, which has less cross sectional area than the 480 Volt or higher voltage motor branch circuit for a vertical motor in the nacelle. The right angle gearbox is configured to multiply the torque and reduce the size of the motor, and connects to the fan hub. The system achieves a lowest tunnel operating airspeed by configuring of the VFD, and guarantees that the motor will never run below the speed needed to keep the motor cool without supplemental cooling, thereby allowing the use of a standard, invertor duty, open drip proof motor. A gearbox ratio is selected that limits the fan RPM to the motor's top RPM, reached at a frequency slightly higher than 60 hertz. This RPM exists when the torque that the drive train can produce is lower than the torque required for the fan to deliver the maximum designed power for the wind tunnel. This design guarantees that an operator cannot operate the tunnel to air speeds greater than intended by the design of the system. Cooling and lubricating the gearbox is achieved using an oil pump and cooling fan and tank located outside of the wind tunnel, and thereby provides for easy maintenance.

Figure 6:
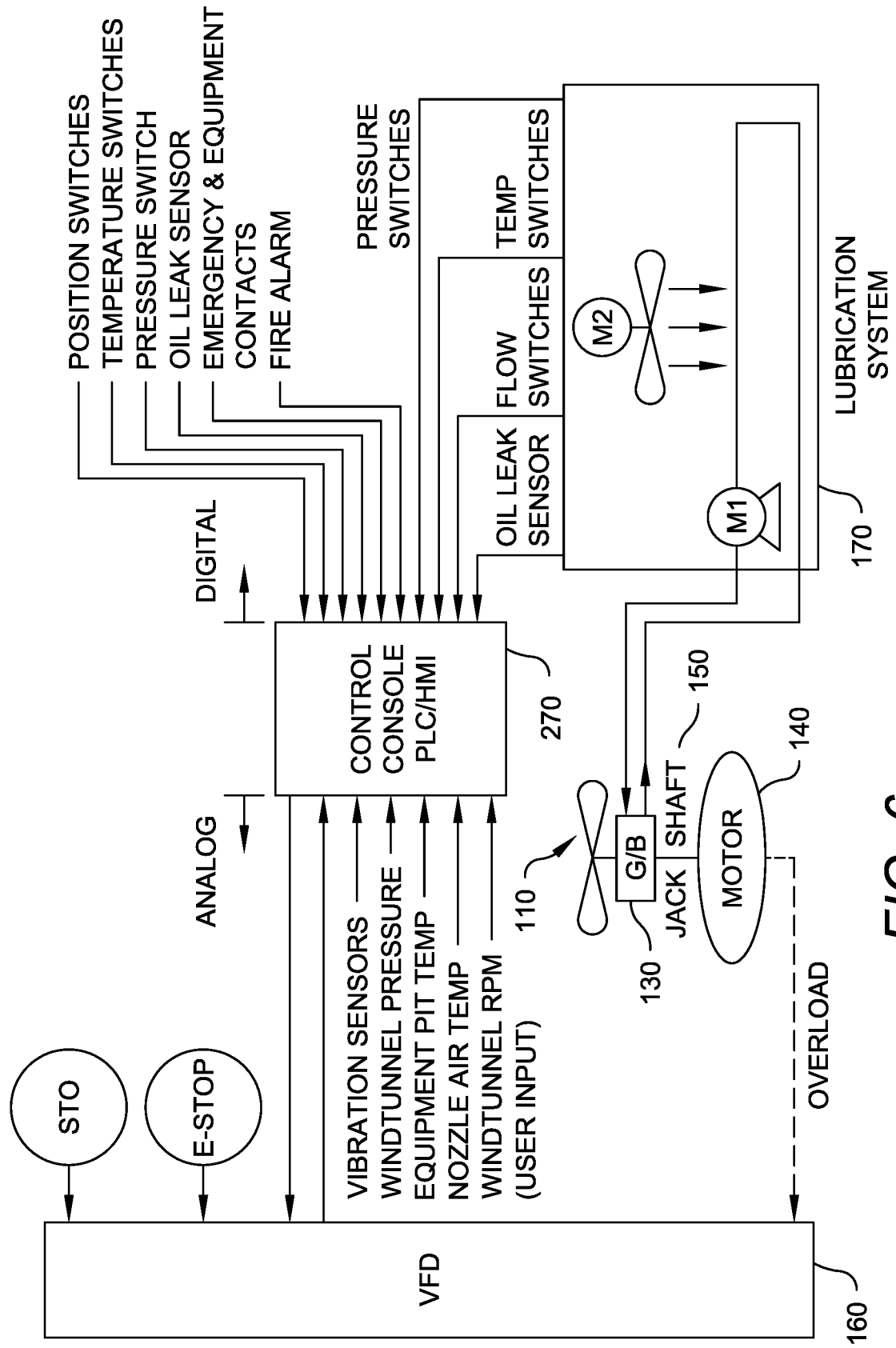
FIG. 6 is an exemplary connection diagram between electronic devices according to an embodiment of the disclosure.
Figure 9:
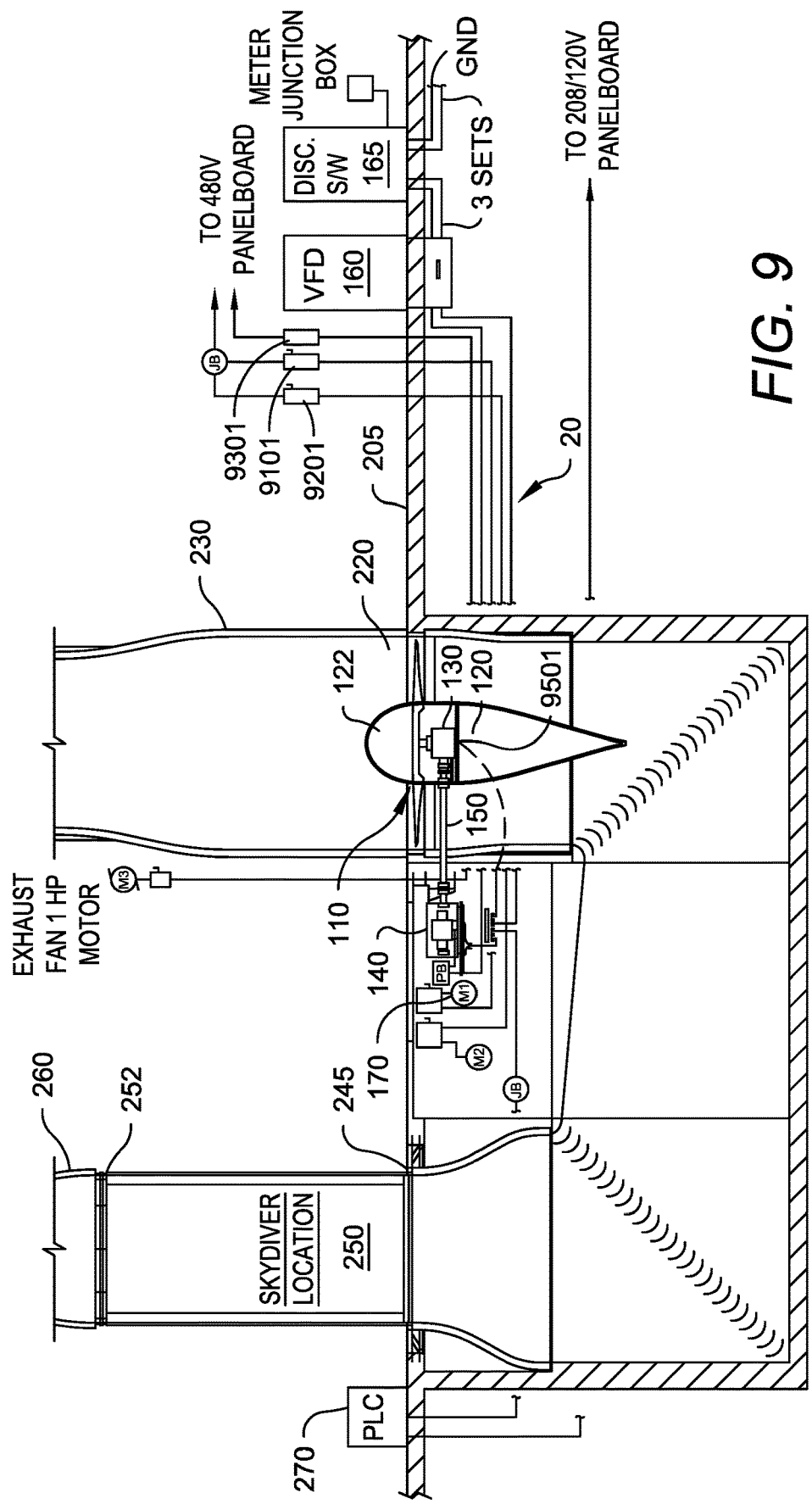
FIG. 9 is a schematic diagram showing instrumentation and control component interconnects associated with the wind tunnel system and architecture according to an embodiment of the disclosure.

With further reference to the drawings of FIGS. 1-9, and in particular to FIGS. 6, 7 and 9, there are shown interconnected components of a power limited, sky diving wind tunnel drive train and system according to aspects of the present disclosure. Components include:
  1) 480 Volt, IEEE Compliant, voltage source, variable frequency drive 160 with integral line side disconnect switch 165, current limiting fuses and safe torque off (STO);
  or
  medium voltage (>1,000 Volts) voltage source, variable frequency drive with: an active or passive front end; integral line side disconnect switch and contactor; output disconnector; and integral DC flux or injection braking or DC chopper braking, with external breaking resistors.
  2) 460 Volt, open drip proof, horizontal, invertor duty, Induction motor or a 4,000 Volt, horizontal, invertor duty, induction motor.

3) Jack shaft and couplings between the motor outside of the wind tunnel and the gearbox with the nacelle of the wind tunnel.

4) Right angle gearbox that connects to the fan and is sized to limit the speed of the fan to the desired safe maximum speed and handle the upward thrust of the fan and the downward weight of the fan.

5) Fan hub to gearbox coupling with interference fit and bolted connection for reliability.

6) Lube oil pump and fan system that are located outside of the nacelle for easy maintenance, have instrumentation to protect the gearbox and provide alerts for potential problems within the gearbox and enables changing the oil from outside of the wind tunnel.

7) Instrumentation and control system to provide system integrity and operator interface 8) Control Console with HMI operator screen, safety relays and e-stop.

System Integration includes i) sizing the motor and gearbox to produce power that can provide but cannot exceed the power to handle the wind tunnel load resulting from a flyer or flyers within the wind tunnel at a defined maximum air speed; ii) using a fan with the inertia that will enable the fan to keep turning and producing sufficient air speed to safely lower the flyer or flyers, upon the unexpected loss of electrical power to the system; iii) operating the wind tunnel at a wind speed that is safe for flyers (users) to enter and exit the wind tunnel and that does not produce lift while operating the motor at an RPM which eliminates the need for external cooling of the motor.

The following system implementation description and functionality is further provided by way of non-limiting example.

With reference to the drawings, the control system component(s) may utilize a programmable Logic Controller (PLC) 270 (FIG. 6) for non-safety controls and functions and two safety relays with the "Safe Torque Off" function in the Variable Frequency Drive (VFD) 160 to provide Safety Integrity Level (SIL) 3 rated equipment maintenance circuits. An operator interface that monitors and allows operator input for VFD speed control, equipment and tunnel monitoring, and alert status may be implemented as a Panelview-800 Touchscreen or other Human Machine Interface and for alarm data logging.

Figure 7A:
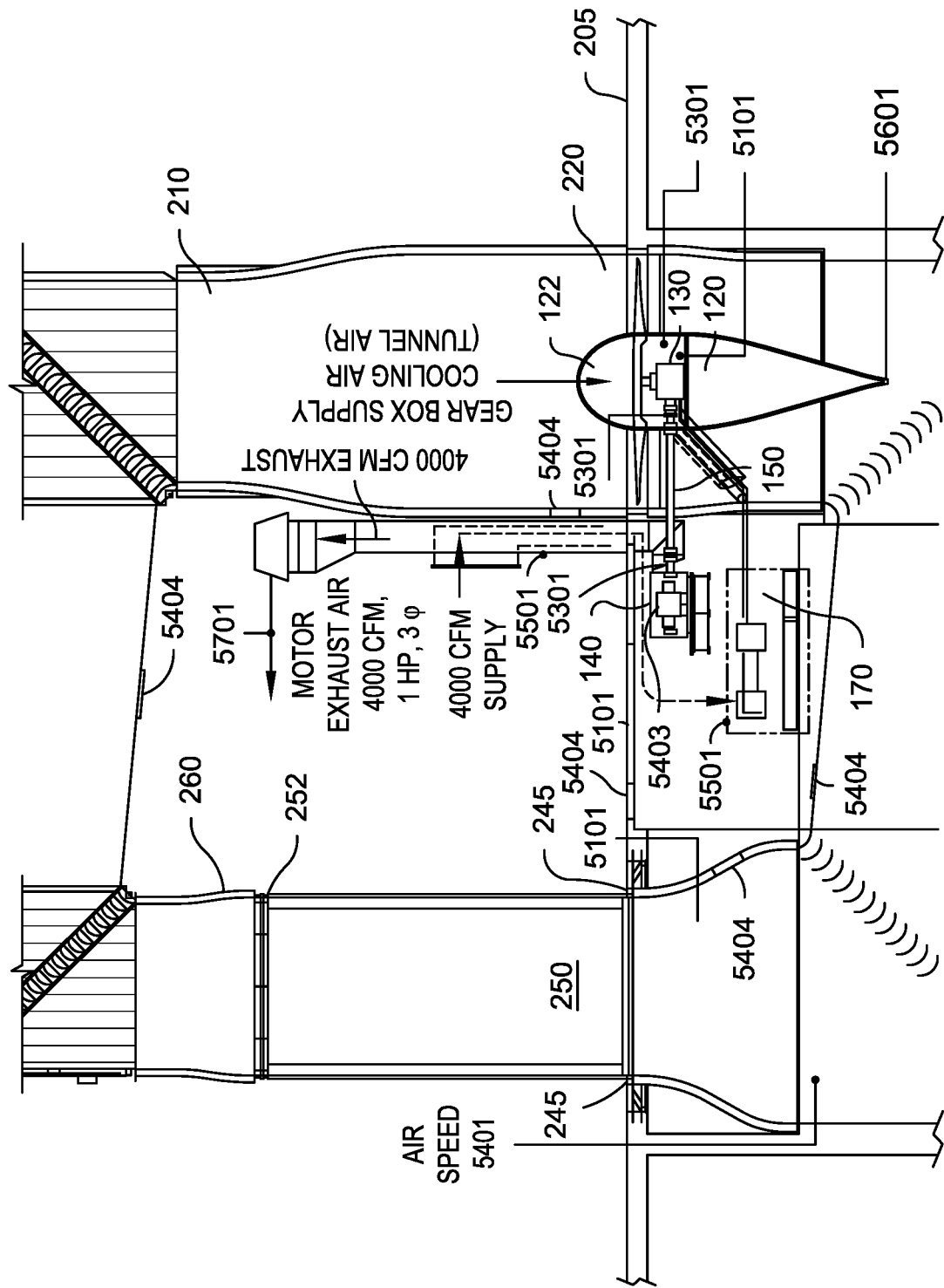
FIG. 7A is a schematic diagram showing instrumentation and control components associated with the wind tunnel system and architecture according to an embodiment of the disclosure.
Figure 7B:
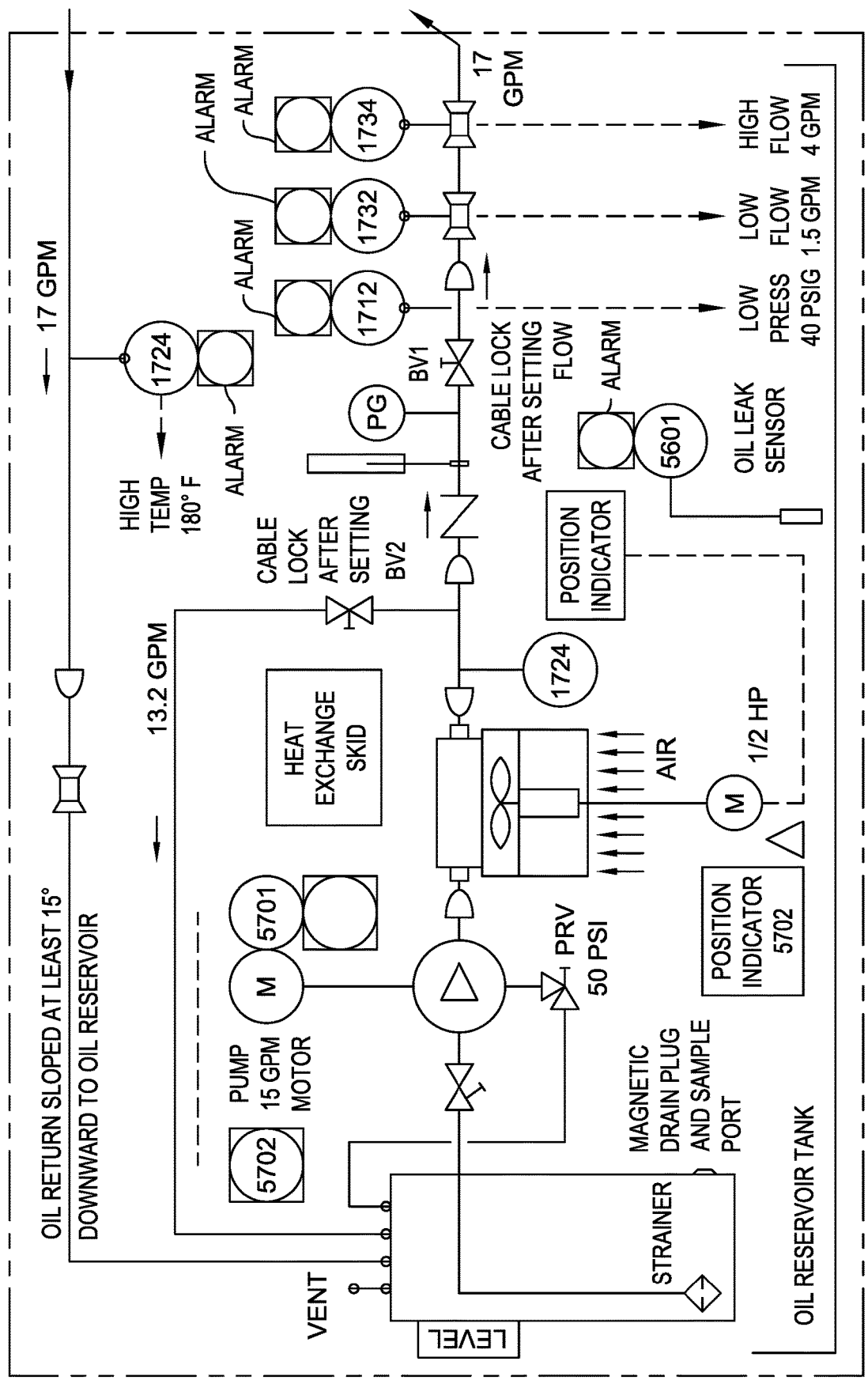
FIG. 7B is a schematic diagram showing electronic and control components associated with the lubrication oil system according to an embodiment of the disclosure.

FIG. 7A is a schematic diagram showing the instrumentation and control components of the window tunnel system and architecture disclosed herein, along with temperature, pressure and vibration sensors and switching elements, safe torque off components, and emergency stop (E-STOP or ES) controls which, when connected to the console PLC 270 shown in FIG. 6, provides safe, reliable, and efficient operation of the wind tunnel. FIG. 7B is a more detailed schematic diagram showing electronic and control components associated with the lubrication oil system shown in FIG. 7A. The following components are identified in FIG. 7A as follows:

pressure differential switch—5401
pressure switch—5402
safe torque off for VFD—5501
temperature sensor—5101
temperature switch—5403
vibration sensor—5301
position switch for door/hatch access—5404
oil leak sensor—5601
hand switch—5701
position indication control—5702

FIG. 9 is a schematic diagram similar to that of FIG. 7A and showing instrumentation and control component interconnects associated with the wind tunnel system and architecture according to an embodiment of the disclosure, including junction box (JB) and pull box (PB) connections, panel board connections, ground wire to gear box 9501, and lube oil pump motor m1 and lube oil fan motor m2 connections.

In an embodiment, an uninterruptable power supply in the control power will provide 2 minutes of 120 Volt power for the control system after the loss of normal building power. There are no backup power systems for the wind tunnel's drive/motor and lube oil systems. The wind tunnel fan has sufficient inertia so that it will provide enough wind for five seconds, to lower a flyer down slowly, after the loss of the normal power system.

In an embodiment, a 500 HP, 1800 RPM, 460 Volt, horizontal, open drip proof motor 140 (FIGS. 2 and 3) powers the wind tunnel fan through a jack shaft 150 that connects to a 2.5:1 right angle gearbox 130 in the nacelle 120. The motor is located in the equipment pit or equipment room. In order to provide adequate cooling within the motor without an external supplemental fan, the VFD is configured so as never to run the motor between 0 RPM and 500 RPM.

The VFD may be implemented as a 500 HP, 480 Volt, IEEE 519 Compliant, active front end, voltage source variable frequency drive with limited braking capability. In an embodiment, the VFD is located remote from the nacelle and motor, preferably in a facility electrical room or equipment room. The 500 HP motor can run at speeds between 500 RPM (nominal wind speed of 40 miles per hour) and 1,915 RPM (nominal wind speed of 157 miles per hour) based on the position of a potentiometer on the PLC control console 270 from the limit set in the VFD and the HMI. The motor RPM rate of change is configurable and may be set during commissioning. A password protected HMI screen enables the operator to set certain operating parameters, such as maximum wind tunnel air speed.

An LED lighting system may be implemented within the system to provide multiple (e.g. four (4)) user defined and one (1) Emergency scene using LED strips mounted on the wind tunnel glass. The LED lighting system includes a lighting control panel, located in the equipment pit or equipment room, and multiple (e.g. five (5))-12 V DC LED strips fed from Class 2 Power Supplies. One of the Class 2 Power Supplies for the 12 V DC Red LED Strip is powered from the UPS in the control console. In an embodiment, the LED lighting system includes a lighting control panel, located in the equipment pit or equipment room, and multiple (e.g. four (4))-24 V DC LED strips fed from Class 2 Power Supplies. One of the emergency scene 12 v Class 2 Power Supply in the control console for the 12 V DC Red LED Strip is powered from the UPS in the control console A utility power meter, such as a PowerSmart Advanced meter, is configured to measure the utility power source's voltage (volts), power consumption (KWh), power demand (KW), total harmonic distortion (THD) and current harmonic distortion (TDD). The meter may be configured to retain these values for up a predetermined time period (e.g. 72 days). The meter is independent and does "not" connect to or communicate with the PLC Control System. The meter may include a Modbus TCP/IP communication via an Ethernet network connection. The meter may be located in the electrical room or the equipment room.

Tunnel Operation

In an embodiment, the following facility conditions are required before "turning on" the wind tunnel system of the present disclosure:
- a. A nominal 480 Volt, three phase (3Ø) power is on the input terminals of the VFD.
- b. 480 Volt, 3Ø Power is on the line side terminals of the lube oil pump 9101 and lube oil fan 9201 combination starters and when applicable the equipment pit exhaust fan 9301 combination starters. The combination starters are located in the accessible electrical room or equipment room.
- c. 120 Volt, 1Ø Power is on the terminals of the Control Console adjacent to the wind tunnel and if provided the lighting control panel.
- d. The building fire alarm system is not in alarm.
- e. The "Safe Torque Off" 5501 Switches in the Equipment Pit and near the Wind Tunnel Hatch Door are in the off position and their red pilot lights are illuminated.
- f. The Emergency Stop Pushbutton on the control console and at the Flight Chamber door are in the non-stop position, pulled out.

The following occurs after the above conditions are met:
- a. The HMI on the control console will display the Main Screen with the on/off selector switch, which will be in the off position.
- b. The VFD performs system checks and magnetizes its DC bus. This will take approximately 10 seconds. If the VFD does not detect faults, the VFD closes its "Ready" contact.
- c. When the VFD Ready Contact is closed and all wind tunnel hatch doors are closed or hatch panels are in place, the HMI displays an On/Off Selector Switch, which will be in the "OFF" position, "Wind Tunnel Off", the Motor RPM and Wind Speed (MPH).

From the control console, a Trained Operator can "turn on" the wind tunnel by moving the On/Off Selector Switch on the HMI to the "On" position. The PLC will do the following:
- a. Closes a PLC DO contact within the 24 Volt AC run circuit of the Gearbox Lube Oil Pump's motor's combination starter. The PLC monitors an auxiliary contact in the motor starter.
- b. Closes a PLC DO contact within the 24 Volt AC run circuit of the Equipment Pit Exhaust Fan's motor's combination starter. The PLC monitors an auxiliary contact in the motor starter. This does not apply to locations with Equipment Rooms.
    - i. Closes a PLC DO contact within the 24 Volt AC run circuit of the Lube Oil Fan's motor's combination starter when "both" the Lube Oil Pump Starter's auxiliary contact is closed and Normally Closed Lube Oil High Temperature Switch 1724 opens. The PLC will keep the Lube Oil Fan motor running for five minutes after the Temperature Switch 1724 closes. The PLC monitors an auxiliary contact in the motor starter.
- c. The PLC monitors the Gearbox Normally Closed Lube Oil Low Flow Switch 1732 and Normally Closed Lube Oil Low Lube Oil Pressure Switch 1712. When "both" switches open, indicating that there is adequate oil flow and pressure, the PLC closes the "Running" DO which connects to the VFD Start/Stop DI.
- d. "Wind Tunnel On" replaces "Wind Tunnel Off" on the HMI.
- e. An Optional Fly Time Stopwatch appears on the HMI screen with four pushbuttons providing the following Fly times:
    - i. Button 1—Set at 60 seconds
    - ii. Button 2—Set at 90 second
    - iii. Button 3—Set at 120 second
    - iv. Button 4—Set at time in seconds entered on the HMI.

Pressing one of the buttons sets the stopwatch. The stopwatch automatically runs down to 0 seconds unless reset to another time by pressing any one of the above buttons.
- f. The VFD increases the motor speed to the wind speed set by the position of the potentiometer. The trained operator can control the wind speed by changing the position of the "Potentiometer". The VFD changes the motor RPM in response to changing the position of the "Potentiometer". The HMI displays the motor RPM.
- g. The PLC monitors a VFD AO. The PLC uses values from pressure 5401 and temperature 5101 instruments, and a formula to calculate the wind speed. The HMI displays the wind speed in MPH.
- h. The Venue's Trained Operator and Instructor are responsible for the safety of the flyer in the tunnel. They are responsible for setting the proper wind speeds based on the size and weight of the flyer or flyers using the potentiometer, by continuous communication between them using hand signals, and by continuously observing and controlling the movement of the flyer within the wind tunnel.

From the control console, an operator can "turn off" the wind tunnel by moving the "Selector Switch" to the "Off" position on the HMI.
- a. "Wind Tunnel Off" replaces "Wind Tunnel On" on the HMI.
- b. The VFD brings the motor to 0 RPM following the Normal Stop Ramp of 25 RPM per second. The Normal Stop Ramp speed and profile may be set during initialization/commissioning of the device.
- c. After expiration of a select time interval (e.g. five (5) minutes), the PLC delivers an electronic signal to open the DO contact within the 24 Volt AC run circuit of the Gearbox Lube Oil Pump's combination starter.
- d. For locations with equipment pits, after expiration of a given time interval (e.g. twenty (20) minutes) the PLC delivers an electronic signal to open the DO contact within the 24 Volt AC run circuit of the Equipment Pit Exhaust Fan's combination starter.

Emergency Stops

A. Category 0 Emergency Stop
- a. The following will cause a Category 0 emergency stop.
    - i. Loss of Utility Power
    - ii. Opening the "Wind Tunnel" Service Entrance Disconnect Switch.
    - iii. Opening the Main Input Switch on the VFD
    - iv. Turning a Safe Torque Off Switches to the "On Position"
- b. The HMI will display a "VFD Fault" or "Safe Torque Off" and either:
    - i. The PLC will close a contact illuminating the Red LED Strip.

Or
    - ii. The PLC will send a signal to the DMX module in the LED Lighting System, which will illuminate Red LEDs.

The facility may provide emergency lighting and illuminated egress signs, if utility power is lost.

c. "Wind Tunnel Fault" replaces "Wind Tunnel On" or "Wind Tunnel Off" on the HMI.
d. If Facility power is also lost, the Lube Oil Pump and Equipment Pit Exhaust Fan will turn off and the HMI will shut off after the expiration of a given time period (e.g. 2 minutes).
e. After utility power returns or the Safe Torque Off switches are placed in the "on" position, the "Reset" pushbutton will appear on the HMI.
f. Press the "Reset" pushbutton on the HMI and follow Section II-C to restart the wind tunnel.
g. The "Safe Torque Off" control stations have provisions for "lock out/tag out" and Red (Not Safe) and Green (Safe) pilot lights. Refer to Section X.

B. Category 1 Emergency Stop
   a. The following will cause a Category 1 Emergency Stop.
      i. Pressing the E-Stop Pushbutton on the Control Console
      ii. An equipment malfunction or an instrument alarm condition.
      iii. Activation of the building's fire alarm system
   b. "Wind Tunnel Fault" replaces "Wind Tunnel On" or "Wind Tunnel Off" on the HMI.
   c. The PLC will close a contact illuminating Red LED strip on the wind tunnel.
   d. Category 1 Emergency Stops activate two (2) safety relays located in the bottom of the control console in the following sequence.
      i. Initially, the activation of the Emergency Safety Timing Relay, ESTR, directly and not through the PLC, commands the VFD to reduce the speed of the motor at the rate configured during commissioning and activates the Emergency Safety Timing Relay.
      ii. When the Emergency Safety Timing Relay times out, the contacts monitored by the "Safe Torque Off" DIs in the VFD will open. At this point, the VFD disables the internal control voltage of the power semiconductors of the VFD output stage to the motor. The motor will coast to a stop. Refer to Safe Torque OFF Section V below.
   e. "Wind Tunnel Fault" replaces "Wind Tunnel On" or "Wind Tunnel Off" on the HMI.
   f. The PLC opens the DO contact connected to the VFD Start/Stop DI.
   g. After pulling out the Emergency Stop Pushbutton or correcting the issue that caused the alarm, a "Reset" pushbutton appears on the HMI.
   h. If an instrument in the lube oil systems caused the emergency stop, the PLC opens the DO contact within the 24 Volt AC run circuit of the Gearbox Lube Oil Pump's combination starter. Otherwise, if the "Reset" pushbutton is not pushed, the PLC will wait five minutes after the initiation of the Category 1 Modified Emergency Stop, before opening the contact within the 24 Volt AC run circuit of the Gearbox Lube Oil Pump's combination starter.
   i. If the "Reset" pushbutton is not pushed, the PLC opens the DO contact within the 24 Volt AC run circuit of the Equipment Pit Exhaust Fan's combination starter 20 minutes after the initiation of the Category 1 Modified Emergency Stop.
   j. Press the "Reset" pushbutton on the HMI and follow Section II-C above to restart the wind tunnel.

Gearbox Lube Oil System
   A. The PLC monitors the Low Flow Switch 1732, High Flow Switch 1734, Low Pressure Switch 1712 and High Temperature Switch 1724 in the Gearbox Lube Oil System.
   Commencing one minute after the PLC closes the DO that starts the Lube Oil Pump, if the Low Flow Switch, the High Flow Switch, the Low Pressure Switch or the High Temperature Switch open, indicating that the oil is not pumping properly, the PLC will initiate a Category 1 Modified Emergency Stop.
   B. The PLC monitors auxiliary contacts on the Lube Oil Pump Starter and the
   Lube Oil Fan Starter. If the PLC detects an unexpected opening of the starters' auxiliary contacts, the PLC will initiate a Category 1 Modified Emergency Stop.
   C. Leak detection sensors are located in the oil containment pans below the Oil Lube Oil Skid and at the bottom of the nacelle below the 2.5:1 gearbox.
   D. The PLC monitors the sensors. When activated, the PLC will display a warning on the HMI and will not permit starting the tunnel.

Inspections and Maintenance
Safe Torque Off
   a. The VFD has a Safe Torque Off feature that "enables short-time maintenance operations like cleaning or working on non-electrical parts of the machinery without opening the 800 Amp Service Entrance Disconnect switch.
   b. When activated, the Safe Torque Off function disables the control voltage of the power semiconductors of the VFD output stage, thus preventing the VFD from generating the torque required to rotate the motor. If the motor is running when Safe Torque Off is activated, the motor coasts to a stop.
   c. Open, lock out, and tag out the local "Safe Torque Off" Disconnect Switch before inspecting or maintaining the 500 HP motor or fan.
   d. The Safe Torque Off circuit has been designed with a Safety Integrity Level (SIL) of 2.
   e. When the VFD Safe Torque Off is enabled, the motor will immediately coast to a stop and the VFD will open the "VFD Enable" contact, which connects to the PLC "Run Enable" DO.
   f. The PLC will display "Safe Torque Off" on the HMI screen. No one should open the motor terminal box, work on the drive train or work on the fan unless "Safe Torque Off" is displayed on the HMI and the Safe Torque Off Switch is open, locked out ad tagged.
   g. During maintenance within the Equipment Pit, move the Selector on the Equipment Pit Exhaust Fan Combination Starter from the "Auto" to the "On" position to provide ventilation in the equipment pit.
   h. The Safe Torque Off control stations include:
      i. On and Off Selector Switch
      ii. Green-Safe Torque OFF Pilot light that illuminates when the equipment can be maintained
   Red-Safe Torque OFF Pilot light that illuminates when the equipment cannot be maintained.

Tunnel Monitoring
A. Located in the equipment pit, Pressure Switch 1712 monitors the pressure after the fan at the bottom of the wind tunnel. The PLC monitors a normally closed contact in the Pressure Switch. When the contact opens, indicating that there is high pressure, the PLC initiates a Category 1 Emergency Stop as described above.
B. A set of air taps located around the nozzle connects to a Differential Pressure Transducer, 5401 using plastic tubing. The Differential Pressure Transducer, 5401, located in the bottom of the control console, sends a 4-20 ma value to the PLC AI. The PLC will calculate the air speed in miles per hour using this value and will display the air speed on the HMI. The PLC will cause a "Nozzle High Differential Pressure Alarm" alarm on the HMI when the differential pressure value is too high and activated a Category 1 Emergency Stop.

C. A set of air taps located around the wind tunnel connects to a Differential Pressure Transducer, using plastic tubing. The Differential Pressure Transducer, located in the bottom of the control console, sends a 4-20 ma value to the PLC AI. The PLC will display the value of the differential pressure across the fan on the HMI. The PLC will cause a "Fan High Differential Pressure Alarm" alarm on the HMI when the differential pressure value is too high and activated a Category 1 Emergency Stop.

D. The PLC monitors a High Temperature Switch in the nacelle. When activated, the PLC will cause a "Nacelle High Temperature" alarm on the HMI activated a Category 1 Emergency Stop.

E. The PLC monitors a Temperature Transducer 5101. When the air temperature reaches a high level, the PLC will cause an "Equipment Pit High Temperature" alarm on the HMI activated a Category 1 Modified Emergency Stop.

F. The PLC monitors a Temperature Transducer 5101. The PLC also uses this value to calculate the air speed. When the temperature reaches a high level, the PLC will cause a "Wind Tunnel High Temperature" alarm on the HMI activated a Category 1 Emergency Stop.

Equipment Monitoring

A. Motor Overload Protection—Connected in series, NC contacts for thermistors that monitor the stator windings of the 500 HP motor for overload, connect directly to the VFD. When a thermistor contact opens, the VFD will initiate a Category 1 Emergency Stop B. Motor Vibration Protection—The PLC monitors the 500 HP motor's drive end Horizontal Vibration Transmitter and Vertical Vibration Transmitter
   a. Vibration transmitters send 4-20 ma values to PLC AIs.
   b. When the vibration level on either transmitter reaches the high vibration value stored in the PLC, the HMI will display a "High Motor Vibration" warning.
   c. When the vibration on either transmitter reaches the high-high vibration value stored in the PLC, the HMI will display a "High High Motor Vertical Vibration" or "Motor High High Horizontal Vibration" alarm and the PLC will initiate a activated a Category 1 Emergency Stop.

C. Gearbox Vibration Protection—The PLC monitors the gearbox's Output Horizontal Vibration Transmitter, Output Vertical Vibration Transmitter and the Input Vibration Transmitter.
   a. Vibration transmitters send 4-20 ma values to PLC AIs.
   b. When the vibration level on any of the transmitters reaches the high vibration value stored in the PLC, the PLC will cause a "High Gearbox Output Horizontal Vibration", a "High Gearbox Output Vertical Vibration" or a "High Gearbox Input Vertical Vibration" warning on the HMI.
   c. When the vibration on any of the transmitters reaches the high-high vibration value stored in the PLC, the PLC will cause a "High High Gearbox Output Horizontal Vibration", a "High High Gearbox Output Vertical Vibration" or a "High High Gearbox Input Vertical Vibration" alarm on the HMI and activated a Category 1 Emergency Stop.

D. VFD—The PLC monitors the VFD Fault contact. If the fault is severe, the PLC will activate a Category 1 Emergency Stop or the VFD will cause a Safe Torque Off resulting in a Category 0 Emergency Stop.

E. Access Doors—Normally Open Magnetic switches monitor the access door to the electrical room where the Service Entrance Disconnect Switch and the VFD are located and the access door to the equipment area and pits where the "Safe Torque Off" switches are located. The HMI will display a warning when any of the switches are closed.

Tunnel Hatches—Normally Open Magnetic Switches monitor the tunnel hatches. The switches must be open to start the wind tunnel. The HMI will display a warning when any of the switches close during operation.

PLC monitors auxiliary contacts on the local disconnect switches for the Lube Oil Pump, the Lube Oil Fan and the Exhaust Fan Local Disconnect Switch. When the switches are open, the PLC will display a warning on the HMI and will not permit starting the tunnel.

While the foregoing invention has been described with reference to the above-described embodiment, various modifications and changes can be made without departing from the spirit of the invention. For example, while embodiments of the present disclosure illustrate a closed loop, fixed system wind tunnel platform, it is contemplated that embodiments of the system may implement a single tunnel system where the fan and hub assembly may be positioned in alignment with the flight chamber (e.g. directly beneath). In addition, it is contemplated that a system may be implemented on a mobile platform. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A system for controlling a wind tunnel having a fan and nacelle, the system comprising:
   a) a drive end right angle thrust bearing ratio gearbox housed within the nacelle of the wind tunnel and directly connected to the fan;
   b) a motor disposed remote from the nacelle for powering the fan, the motor being connected to the drive end right angle thrust bearing ratio gearbox via a jackshaft so as to power the fan to rotate at at least a threshold minimum speed sufficient to enable human flight within the wind tunnel; and
   c) a variable frequency drive positioned remote from the wind tunnel that receives a control signal from a programmable logic controller, wherein the variable frequency drive is programmed to regulate the speed of the motor to: a) a first nonzero target motor speed which is not sufficient to cause the fan to rotate at at least the threshold minimum speed; b) a range of second target motor speeds, all second target motor speeds in the range being greater than the first nonzero target motor speed and sufficiently high to cause the fan to rotate at at least the threshold minimum speed; c) a third target motor speed of zero RPM indicative of an off condition; wherein the variable frequency drive device is programmed to operate the motor at nonzero target speeds only equal to or greater than said first nonzero target motor speed.

2. The system of claim 1, further comprising a lubrication system disposed remote from the nacelle and fluidly coupled to the drive end right angle thrust bearing ratio gearbox via a supply conduit for controllably dispensing lubricant thereto.

3. The system of claim 1, wherein the variable frequency drive includes an electronic switch electrically connected to the programmable logic controller for selectively disabling, in response to a user operation, a low control voltage of power semiconductors of an output stage of the variable frequency drive, to thereby prevent the variable frequency drive from generating a torque required to rotate the motor, without activation of a high ampere main disconnect switch.

4. The system of claim 1, wherein the system is a closed loop system defined by a first vertical flight chamber that receives air flow produced via operation of the single fan and hub assembly when operated within said range of second target motor speeds, for levitating a player within the vertical flight chamber, and wherein the nacelle containing the single fan and hub assembly is contained in a second vertical chamber conjoined to the first vertical flight chamber via air flow conduits.

5. The system of claim 1, wherein the drive end thrust right angle bearing ratio gearbox is a 2.5:1 ratio right angle gearbox, and wherein the motor connected thereto is a 500 HP, 1800 RPM motor.

6. The system of claim 5, wherein the drive end right angle thrust bearing ratio gearbox is a 2.5:1 ratio gearbox and the motor connected to the 2.5:1 ratio gearbox via said jackshaft is an open drip proof, invertor duty induction motor.

7. The system of claim 1, wherein the programmable logic controller is responsive to one or more environmental parameters for generating a control signal to the variable frequency drive to controllably adjust motor speed.

8. The system of claim 7, wherein a lubrication system disposed remote from the nacelle and fluidly coupled to the drive end right angle thrust bearing ratio gearbox via a supply conduit for controllably dispensing lubricant thereto, and wherein the programmable logic controller is responsive to one or more of temperature, pressure, leakage, and flow parameters output from the lubrication system for generating a control signal to the variable frequency drive to controllably adjust motor speed.

9. The system of claim 7, wherein one or more horizontal and vertical vibration sensors are positioned about the motor for sensing motor vibration and providing one or more output signals whose amplitudes are indicative of the level of vibration sensed, and wherein the programmable logic controller is responsive to the output signals of said vibration sensors for generating a control signal to the variable frequency drive to stop the motor when the output signal amplitude exceeds a predetermined threshold indicative of a high vertical or high horizontal motor vibration level.

10. The system of claim 1, wherein the first nonzero target motor speed is 500 RPM.

11. The system of claim 1, wherein a lubrication system is disposed remote from the nacelle and fluidly coupled to the drive end right angle thrust bearing ratio gearbox via a supply conduit for controllably dispensing cooled lubricant thereto, wherein a return conduit returns lubricant from said ratio gearbox to said lubrication system, and wherein a cooling unit cools the returned lubricant prior to recirculation to said ratio gearbox, thereby maintaining flow and temperature of the ratio gearbox.

12. The system of claim 7, wherein one or more horizontal and vertical vibration sensors are positioned about the ratio gearbox for sensing gearbox vibration and providing one or more output signals whose amplitudes are indicative of the level of vibration sensed, and wherein the programmable logic controller is responsive to the output signals of said vibration sensors for outputting a control signal to the variable frequency drive to stop the motor when the output signal amplitude exceeds a predetermined threshold indicative of a high vertical or high horizontal gearbox vibration level.

13. A system for controlling a wind tunnel having a fan and nacelle, the system comprising:
    a drive end right angle thrust bearing ratio gearbox housed within the nacelle of the wind tunnel and directly connected to the fan;
    a motor disposed remote from the nacelle for powering the fan, the motor being connected to the ratio gearbox via a jackshaft; and
    a variable frequency drive positioned remote from the wind tunnel and configured to regulate the speed of the motor within a minimum and maximum operational range of the motor;
    wherein a lubrication system disposed remote from the nacelle is fluidly coupled to the ratio gearbox for controllably dispensing lubricant thereto via a supply conduit, and wherein a programmable logic controller is responsive to one or more of temperature, pressure, leakage, or flow parameters output from the lubrication system for generating a control signal to the variable frequency drive to controllably adjust motor speed.

14. The system of claim 13, wherein one or more horizontal and vertical vibration sensors are positioned about the motor for sensing motor vibration and providing one or more output signals whose amplitudes are indicative of the level of vibration sensed, and wherein the programmable logic controller is responsive to the output signals of said vibration sensors for outputting a control signal to the variable frequency drive to stop the motor when the output signal amplitude exceeds a predetermined threshold indicative of a high vertical or high horizontal motor vibration level.

15. The system of claim 13, wherein the drive end right angle thrust bearing ratio gearbox is a 2.5:1 ratio gearbox.

16. The system of claim 13, wherein a return conduit returns lubricant from said ratio gearbox to said lubrication system, and wherein a cooling unit cools the returned lubricant prior to recirculation to said ratio gearbox via said supply conduit, thereby maintaining flow and temperature of the ratio gearbox.

17. The system of claim 13, wherein one or more horizontal and vertical vibration sensors are positioned about the ratio gearbox for sensing gearbox vibration and providing one or more output signals whose amplitudes are indicative of the level of vibration sensed, and wherein the programmable logic controller is responsive to the output signals of said vibration sensors for outputting a control signal to the variable frequency drive to stop the motor when the output signal amplitude exceeds a predetermined threshold indicative of a high vertical or high horizontal gearbox vibration level.

18. The system of claim 13, wherein said variable frequency drive receives a control signal from a programmable logic controller, wherein the variable frequency device is programmed to adjust the speed of the motor to a) a first nonzero target motor speed which is not sufficient to cause the fan to rotate at at least a threshold minimum speed enabling human flight within the tunnel; b) a range of second target motor speeds, all second target motor speeds in the range being greater than the first nonzero target motor speed and sufficiently high to cause the fan to rotate at at least the threshold minimum speed; c) a third target motor speed of zero RPM indicative of an off condition;

wherein the variable frequency drive is programmed to operate the motor at nonzero target speeds only equal to or greater than said first nonzero target motor speed.

19. The system of claim 18, wherein a potentiometer adjustable via a user interface coupled to the programmable logic controller sets the second target motor speed.

20. The system of claim 13, wherein the variable frequency drive includes an electronic switch electrically connected to the programmable logic controller for selectively disabling, in response to a user operation, a low control voltage of power semiconductors of an output stage of the variable frequency drive, to thereby prevent the variable frequency drive from generating a torque required to rotate the motor, without activation of a high ampere main disconnect switch.

21. The system of claim 13, wherein a first set of bolts connect through a fan hub assembly to the gearbox for securing the fan hub assembly to the gearbox.

* * * * *